April 29, 1958     J. G. CARTER     2,832,903
VIBRATION GENERATORS

Filed March 12, 1954     2 Sheets-Sheet 1

Inventor
John George Carter
By
          Attorney

United States Patent Office 2,832,903
Patented Apr. 29, 1958

2,832,903

VIBRATION GENERATORS

John George Carter, Ashford, England, assignor to Goodmans Industries Limited, Wembley, England Application March 12, 1954, Serial No. 415,916

3 Claims. (Cl. 310—27)

This invention relates to vibration generators of the moving coil type and has for its main object to provide an improved form of generator which is capable of operating efficiently under the different conditions and for the different purposes for which such generators are used at the present time.

In the operation of vibration generators of the type mentioned, it is desirable to be able to measure the amplitude of oscillation of the vibratory system for any given load and frequency conditions and it is a further object of the invention to provide a novel or improved monitoring or pick-up device for this purpose and a method of embodying same in the generator structure.

According to the invention the improved generator comprises a permanent magnet assembly embodying a centre pole member, an outer ring structure and front and end plates of which the front plate co-acts with the tip of the centre pole member to form the annular air gap, an armature located at the front end of the magnet assembly and rigid with a coil former which carries the driving coil and is disposed in said air gap, and a non-ferrous driving shaft which extends axially through a bore in the magnet assembly, said shaft being secured at one end to the armature and being formed at the other end for connection to the member to be vibrated. Preferably, there is provided in association with the driving shaft a monitoring or pick-up device of the moving coil type for measuring the amplitude of oscillation of the vibratory system when desired, said device being disposed at the opposite end of the magnet assembly to the armature and in a position where it is screened from the main magnet by the associated end plate.

Figure 1:
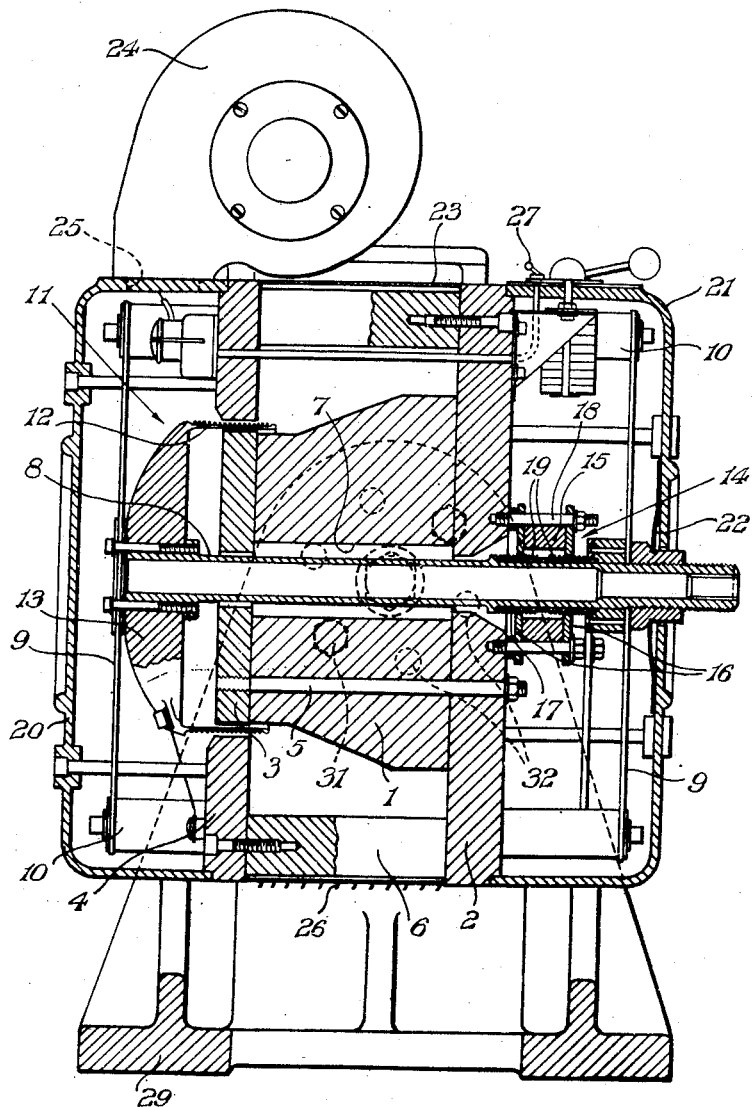
Figure 2:
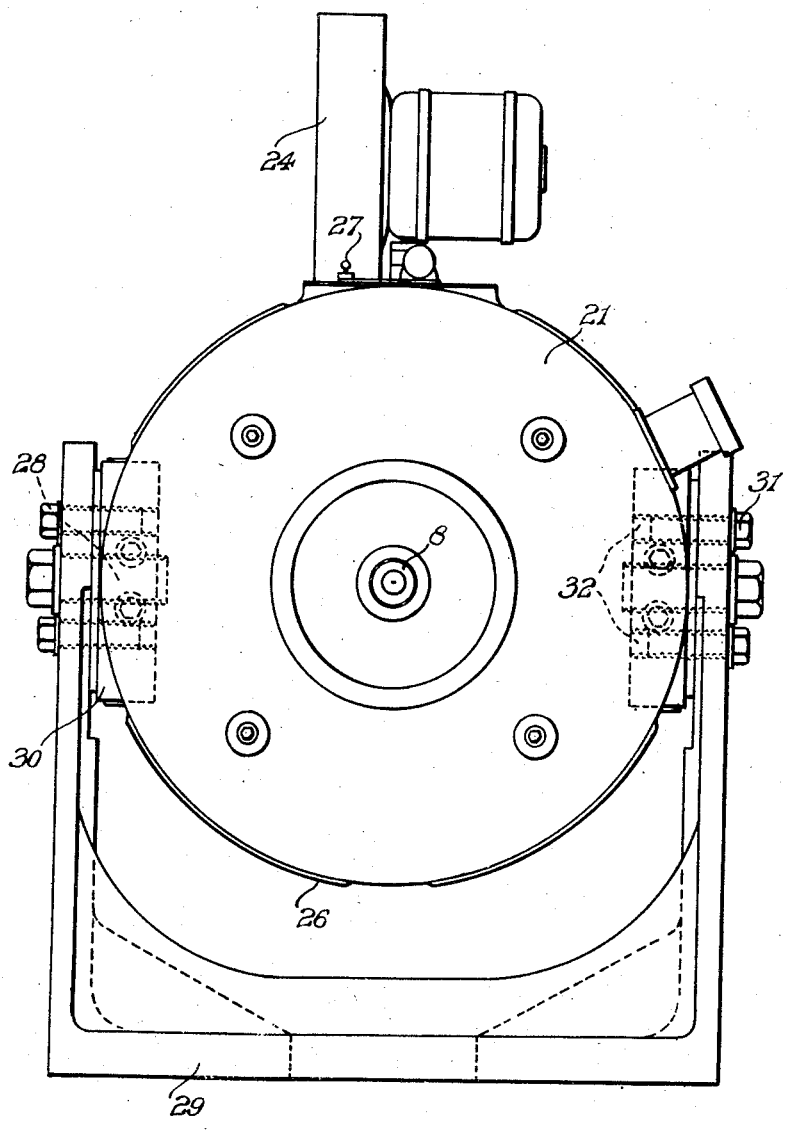

Reference will now be made to the accompanying drawings which illustrate by way of example one embodiment of the invention and wherein Fig. 1 is an axial section through the generator, and Fig. 2 is an end view thereof.

As shown, the generator includes a permanent magnet assembly comprising a centre pole magnet 1 of substantial dimensions, said magnet, for convenience in manufacture, being constituted by a series of sector shape blocks arranged in close juxtaposition to form a plug-like body of combined cylindrical and frusto-conical shape. The said magnet seats at one end upon an end plate 2 and has attached to its other end a pole tip 3 which co-operates with a front plate 4 to form the requisite air gap, the magnet, end plate and pole tip being rigidly secured together by bolts one of which is shown at 5. The magnetic circuit is completed by a series of mild steel rods or bars 6 arranged in spaced relation and bolted at their opposite ends to the front plate 4 and to the end plate 2 respectively. The magnet 1 is formed with an axial bore 7 through which extends with slight clearance a non-ferrous driving shaft 8, preferably in the form of a Duralumin tube, said shaft being suspended at each end by a centering device 9 of known type and fixed to pillars 10 on the front and end plates. The forward end of the shaft 8 is bolted to an armature 11 whilst its other end is screw threaded or otherwise formed for connection to the member to be vibrated.

The armature, which is made of non-ferrous metal of high tensile strength, consists of a cylindrical coil former section 12 adapted to be located in the annular air gap and, integral therewith, a cap portion 13 to which is bolted at its centre the related end of the driving shaft.

The apparatus shown embodies a novel monitoring or pick-up device for enabling the amplitude of oscillation of the vibratory system to be measured under any particular operating conditions. For this purpose a small moving coil unit 14 is supported adjacent the operating end of the driving shaft, so that it is effectively screened from the main magnet 1 by the end plate 2. The said unit encircles the driving shaft and consists of a ring-shaped magnet 15 located between two annular pole plates 16 which cooperate at their inner edges with a mild steel sleeve 17 fast on the driving shaft to define two co-axial air gaps, said sleeve completing the path of flux flow between the two pole plates. The magnet and pole plates are secured together by bolts 18 which also serve to mount the assembly upon the end plate 2. A tandem coil assembly is used, that is, two coils 19 connected in series and located respectively in the two aligned air gaps, the coils being wound upon but being insulated from the steel sleeve 17. Thus when the generator is operating, the tandem coil assembly is oscillated within the air gaps so causing a voltage to be induced in the coils which is proportional to the frequency and amplitude of the oscillations, and with the frequency known, measurement of this induced E. M. F. will enable the amplitude of oscillation to be readily ascertained.

The generator mechanism is enclosed at the ends by a pair of end caps 20, 21 bolted to the front plate and end plate respectively, the end cap 21 being apertured for passage of the driving shaft and the aperture being sealed by a flexible disc 22. The space between the front plate and end plate is also enclosed by a two-part sheet metal cover 23. To remove the heat generated in the region of the driving coil, a motor driven fan or blower 24 is mounted on the upper side of the generator, said fan discharging a stream of air through a port 25 in the end cap 20 from whence it flows through the annular air gap and then away through louvred openings 26 in the lower side of the metal cover 23. The fan is controlled by a switch 27.

For convenience in use, the generator is mounted by means of trunnions 28 on a stand or support 29 to permit it to be adjusted to a desired angular position, the trunnions being mounted in the arms of the stand and engaging in blocks 30 fixed to and extending between the front and end plates. The generator is secured in a set position, by the use of detachable locking pins 31 which are inserted in apertures in the arms of the stand and engage selectively rings of sockets 32 formed in the blocks 30.

I claim:

1. A vibration generating motor of the moving coil type comprising a permanent magnet assembly embodying a center pole member, an outer ring structure, a front plate and an end plate, said front plate co-acting with the tip of the center pole member to form an annular air gap, an armature located at the front end of the magnet assembly and rigid with a coil former, said coil former carrying a driving coil and being disposed in said air gap, a non-ferrous driving shaft extending axially through a bore in the magnet assembly, said shaft being secured at one end to said armature and being formed at the other end for connection to the member to be vibrated, a monitoring or pick-up device of the type having a moving coil for measuring the amplitude of oscillation of the vibratory system when desired, said device being disposed at the opposite end of the magnet assembly to the armature and in a position where it is screened from the main magnet by the said end plate said moving coil carried upon and oscillated by said driving shaft and centering means for said driving shaft for locating said shaft as well as said driving and moving coils.

2. A vibration generating motor of the moving coil type comprising a permanent magnet assembly embodying a center pole member, an outer ring structure, a front plate and an end plate, said front plate co-acting with the tip of the center pole member to form an annular air gap, an armature located at the front end of the magnet assembly and rigid with a coil former, said coil former carrying a driving coil and being disposed in said air gap, a non-ferrous driving shaft extending axially through a bore in the magnet assembly, said shaft being secured at one end to said armature and being formed at the other end for connection to the member to be vibrated, a monitoring or pick-up device of the moving coil type for measuring the amplitude of oscillation of the vibratory system when desired, said device being disposed at the opposite end of the magnet assembly to the armature and in a position where it is screened from the main magnet by the said end plate, a magnetic sleeve fixed on said driving shaft, said monitoring device comprising a ring-shaped magnet located betwen two annular pole plates which co-operate at their inner edges with said sleeve to define two co-axial air gaps, and a pair of coils located in said air gaps, said coils being wound upon but insulated from said sleeve.

3. A vibration generating motor of the moving coil type comprising a permanent magnet assembly embodying a center pole member, an outer ring structure, a front plate and an end plate, said front plate co-acting with the tip of the center pole member to form an annular air gap, an armature located at the front end of the magnet assembly and rigid with a coil former, said coil former carrying a driving coil and being disposed in said air gap, a non-ferrous driving shaft extending axially through a bore in the magnet assembly, said shaft being secured at one end to said armature and being formed at the other end for connection to the member to be vibrated, a monitoring or pick-up device of the moving coil type for measuring the amplitude of oscillation of the vibratory system when desired, said device being disposed at the opposite end of the magnet assembly to the armature and in a position where it is screened from the main magnet by the said end plate, said monitoring device comprising a ring-shaped magnet located between two annular pole plates, a magnetic sleeve fast on said driving shaft, and forming with the inner peripheries of said annular pole plates two co-axial air gaps, a pair of coils located in said air gaps, said coils being wound upon but insulated from said sleeve, and bolt means securing said ring magnet and pole plates together, said bolt means being secured to said end plate of the permanent magnet assembly.

References Cited in the file of this patent

UNITED STATES PATENTS

| | | |
|---|---|---|
| 1,531,965 | McKee | Mar. 31, 1925 |
| 2,002,372 | Greentree | May 21, 1935 |
| 2,067,803 | Thearle | Jan. 12, 1937 |
| 2,289,962 | Hancock | July 14, 1942 |
| 2,297,084 | Swallow | Sept. 29, 1942 |
| 2,596,048 | Severs | May 6, 1952 |
| 2,599,036 | Efromson | June 3, 1952 |
| 2,645,728 | Willson | July 14, 1953 |